Jan. 1, 1935.   R. J. S. PIGOTT   1,986,600
VARIABLE ORIFICE CHOKE VALVE
Filed Sept. 6, 1933   5 Sheets-Sheet 1
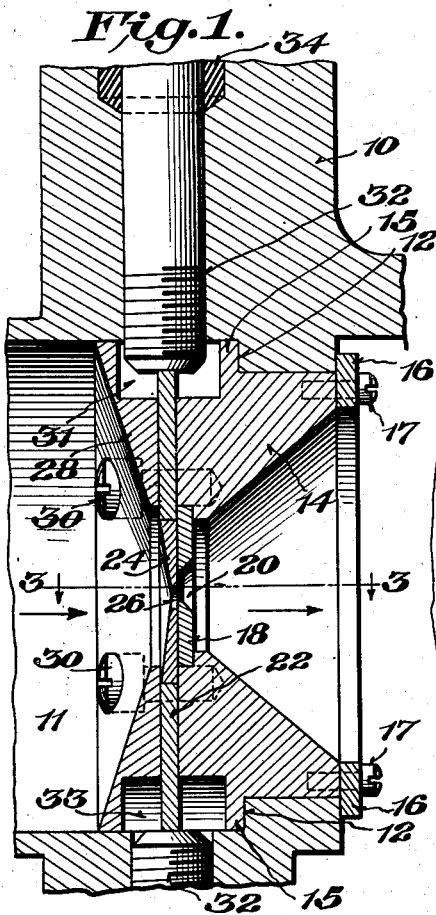
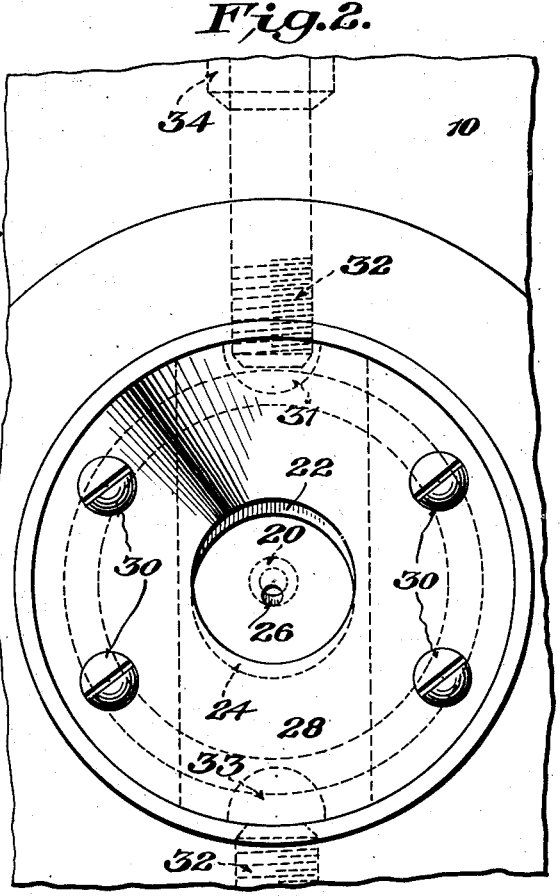
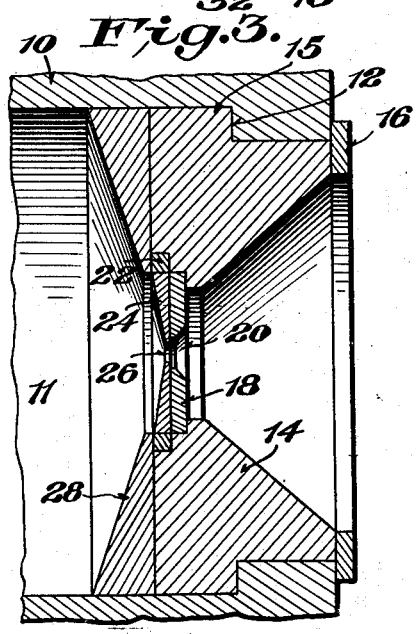
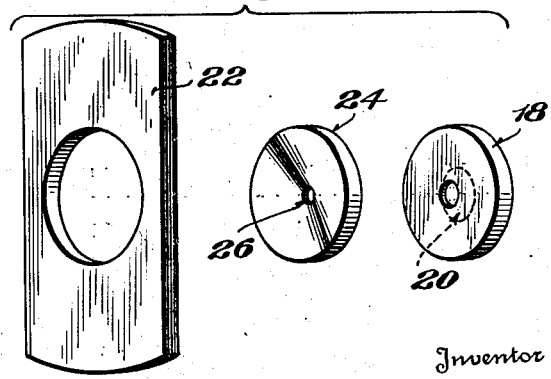
Inventor
Reginald J. S. Pigott,
By A. M. Houghton
his Attorney

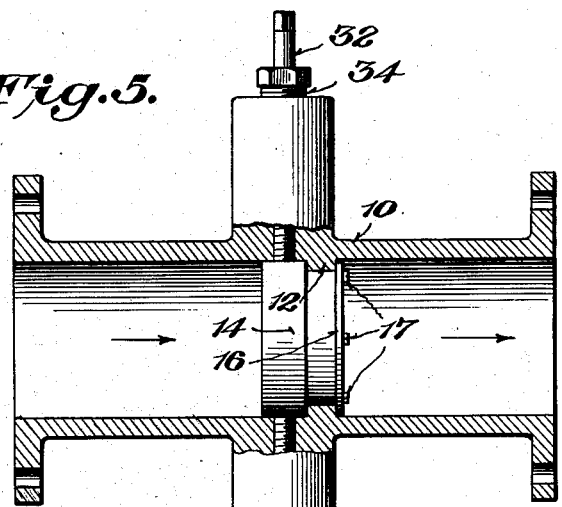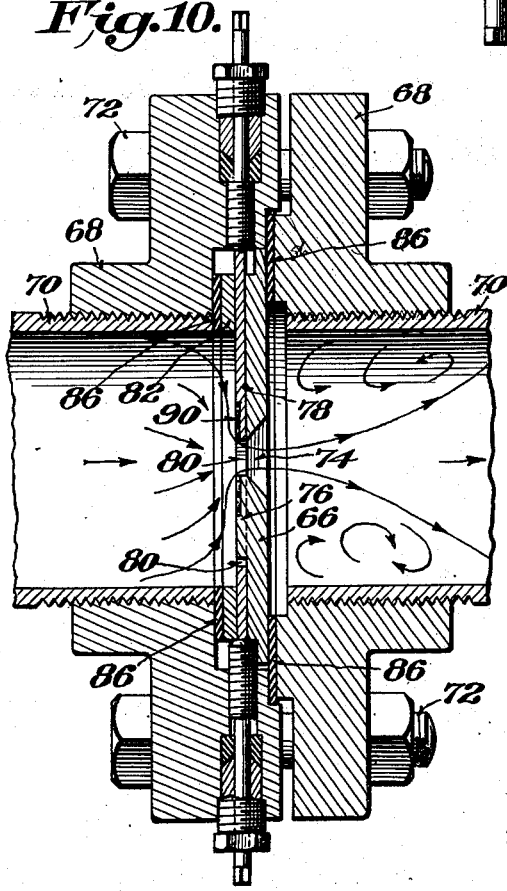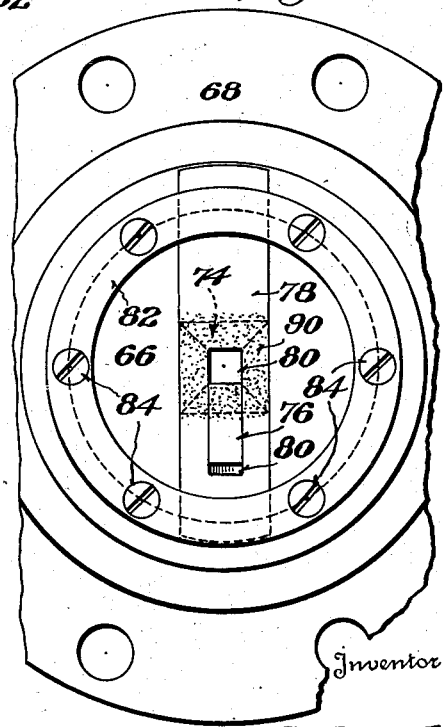

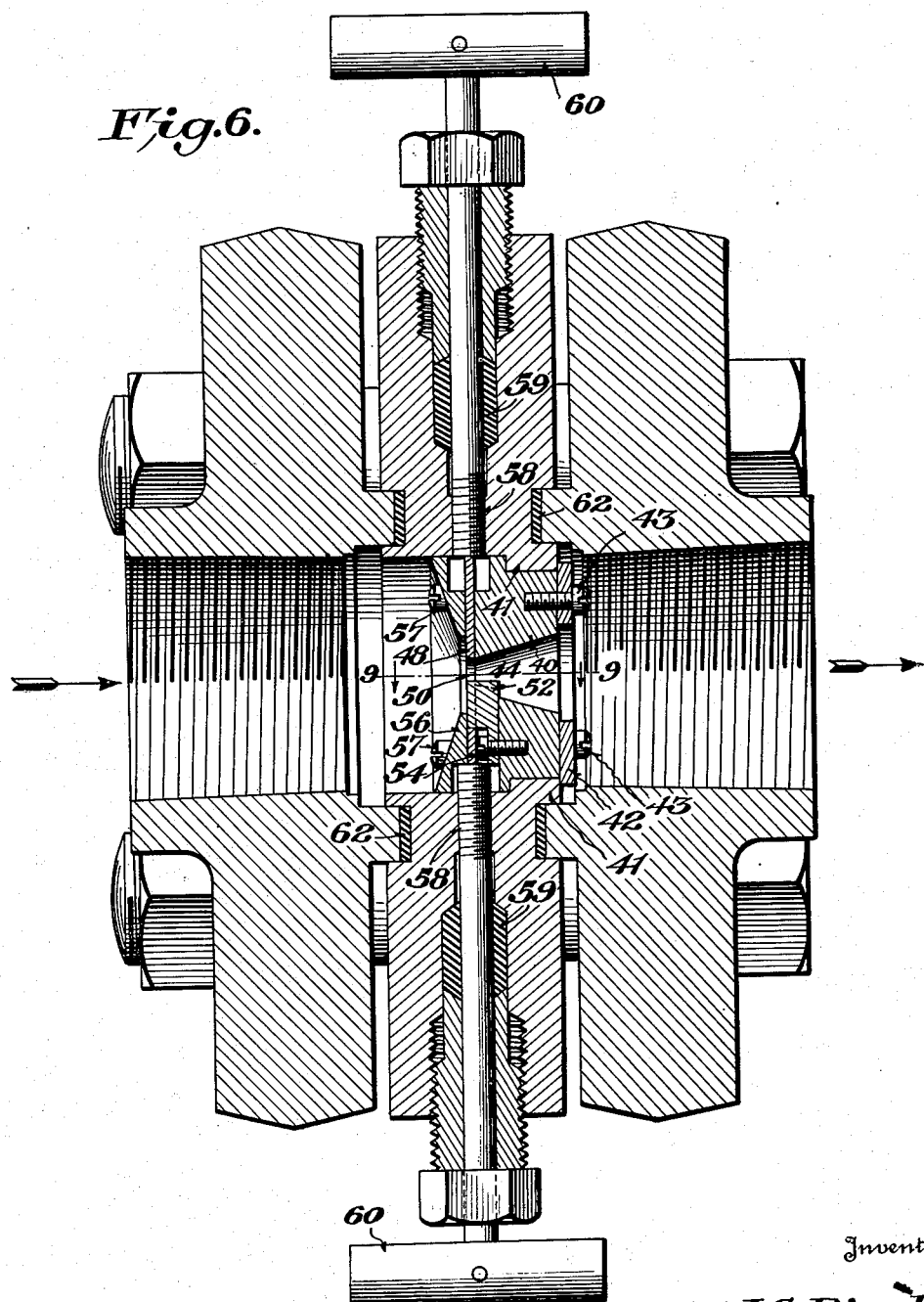

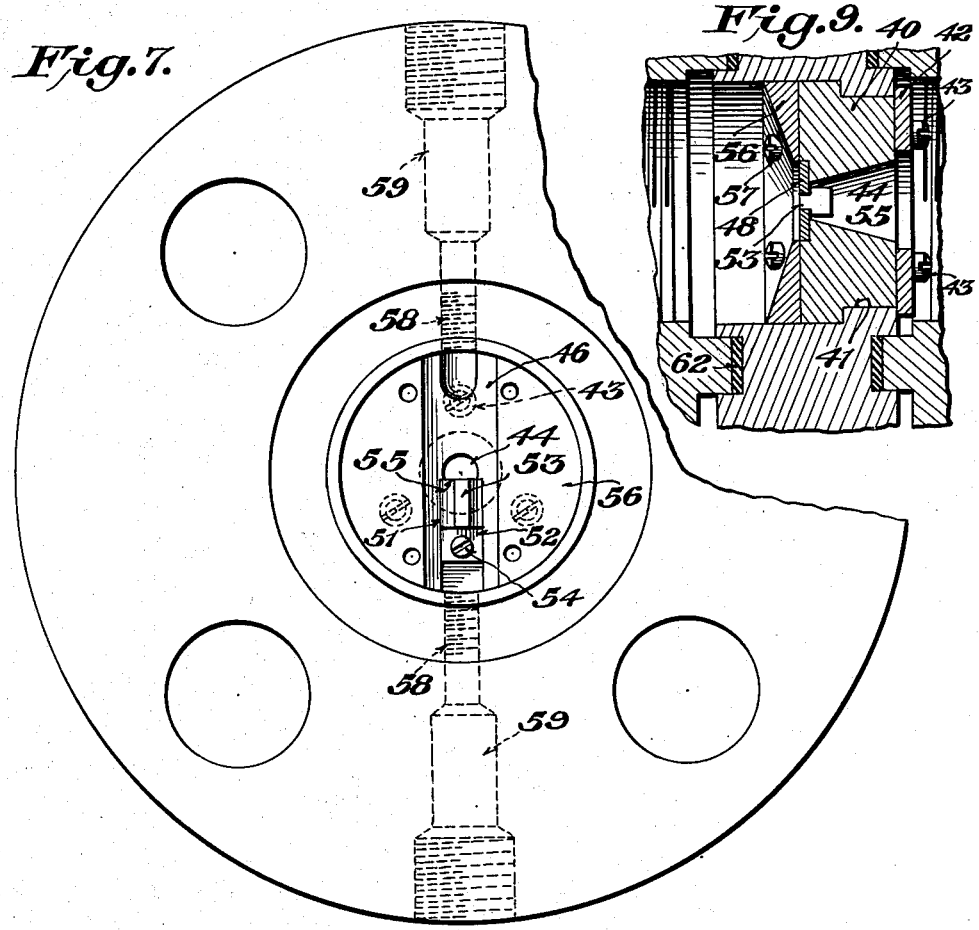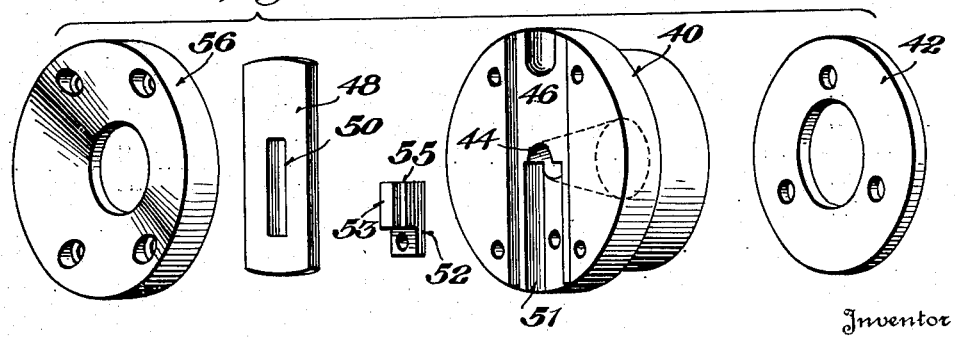

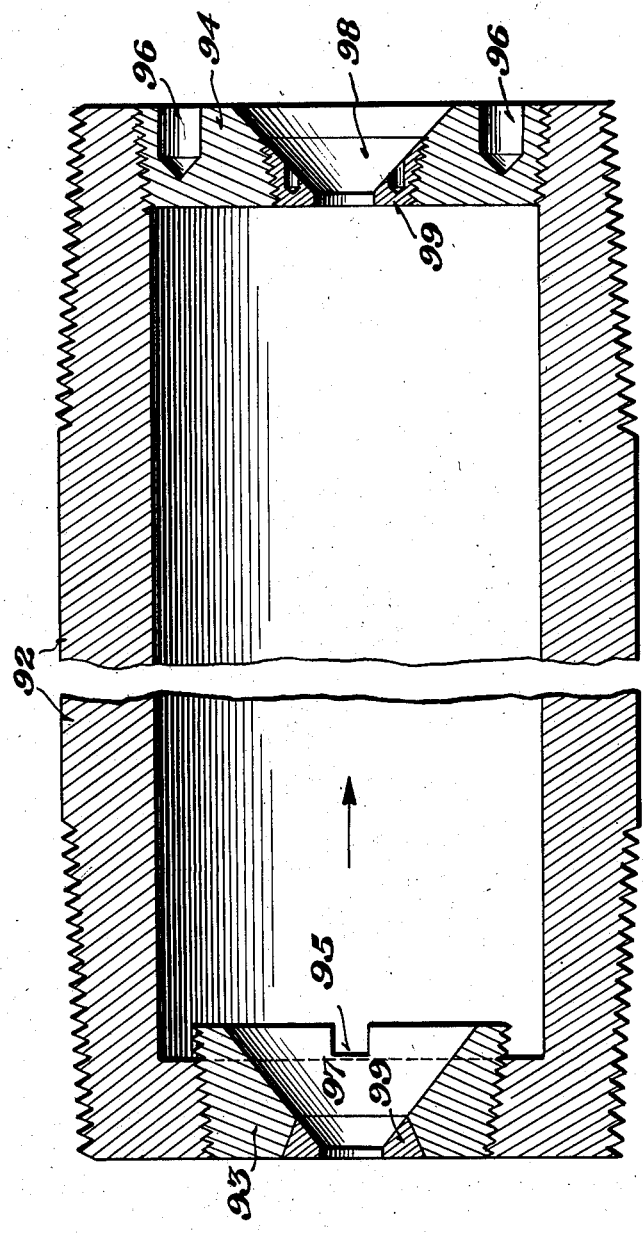

Patented Jan. 1, 1935

1,986,600

UNITED STATES PATENT OFFICE 1,986,600

VARIABLE ORIFICE CHOKE VALVE

Reginald J. S. Pigott, Pittsburgh, Pa., assignor to Gulf Research & Development Corporation, Wilmington, Del., a corporation of Delaware Application September 6, 1933, Serial No. 688,372

10 Claims. (Cl. 137—75)

This invention relates to variable orifice choke valves; and it comprises an oil well flow bean or choke protected against internal erosion by the sand in flowing oil and adjustable for variable control of the flow of oil, said flow bean comprising a casing adapted for connection in the oil flow line, a substantially flat faced flow resisting member in said casing having formed therein an orifice contracted at the upstream face and flaring outwardly to the downstream face, a flat faced gate member slidably held upon the flat upstream face of said orificed flow resisting member, said gate member having a sharp cornered and thin lipped opening adapted to register with the orifice of the flow resisting member and to vary the effective orifice area upon sliding movement of the gate member, said sharp cornered and thin lipped opening being adapted to establish and maintain a flowing oil stream contracted away from the walls of the orifice near the entrance and expanded in eddy currents beyond the entrance and means for adjusting the position of the gate member upon the orificed flow resisting member; all as more fully hereinafter set forth and as claimed.

In controlling the discharge of oil from a flowing well it is the custom to insert in the discharge line of the well a "choke" or "flow bean" to reduce the rate of discharge. There are numerous advantages to be obtained through thus restricting the flow. "Sanding up" with consequent premature stoppage of flow from the well is reduced or prevented. Restricting the flow also avoids damage to the pumping equipment, etc. by reducing the amount of sand carried in the oil and lessening the abrasion effects due to high flow velocity. Restriction of the flow may also be necessary to control the production rate.

It has long been known that ordinary types of valves could not be used for this purpose, principally because of extreme wear from abrasion, due to the high pressures at which the oil is projected and its frequent high sand content. Heretofore it has been common practice to control the discharge from the well by inserting in the discharge line of the well a choke or flow bean consisting simply of a short, thick-walled section of pipe or a nipple having a small cylindrical bore through which only a relatively small flow of oil could pass. Such a device builds up back pressure in the well so that the oil in flowing through the nipple attains a very high velocity. Because of this increased velocity the abrasive or erosive action of sand carried by the oil is materially increased and as a result the down stream end of the nipple is rapidly worn away by erosion and in a short while the bore assumes a trumpet shape, permitting an undesirable increased flow of oil. At this stage the well must be shut down and a new flow bean substituted for the worn one. Shutting down a well is undesirable, as it may lower the capacity of the well when again opened up.

Venturi-shaped, rather than cylindrical bored, flow beans have also been used. This shape, offering as it does a lower resistance to flow than a cylindrical tube, makes it necessary in order to obtain the same choking effect to reduce the size of the throat of the venturi until it is much smaller than a corresponding cylindrical bore with no rounding of the entry. This results in a further increase in velocity of the oil passing therethrough and in consequence abrasive effects which make this type of flow nipple also undesirable. The needle type of valve has sometimes been used in flow beans, but this construction while it has the advantage of being adjustable, has also proved inefficient in use and continually in need of adjustment due to the abrasive effects aforementioned.

In the present invention I provide a choke valve in which the flow obstruction is effected by a flat faced member having an orifice contracted, thin lipped and sharp edged at the upstream side and flaring outwardly toward the downstream side and adjustable control of the effective orifice area is secured by means of a straight faced gate member slidable upon the flat upstream face of the orificed member and having a sharp edged or cornered aperture registering with the orifice, providing a thin lipped orifice entry and serving to vary the effective area of the gated orifice as the gate member is slid upon the orificed member. So doing, I take advantage of the tendency of a thin plate obstruction with a sharp cornered orifice therein to cause contraction of the fluid stream away from the orifice walls followed by a swirling expansion of the stream with induced eddy currents; the thin plate, sharp cornered orifice conditions being maintained by the gate member at all of its adjusted positions determining the effective orifice area. As a result, the wearing effects upon the valve by sand carried in the oil stream are reduced to a minimum and the small change of resistance due to wear of the valve parts can be compensated by adjustment of the gate member. Frictional resistance offered by the orifice walls is confined to that of the thin lipped, sharp edged orifice entrance; this being a small resistance; the energy expended in overcoming the total resistance of the flow obstructing member being dissipated in the contraction and swirling expansion or in heat due to liquid friction of the oil stream as it passes through the valve orifice.

For choking flows under heavy pressures such as are common in oil wells it is advantageous to have the orificed member relatively thick and the orifice coned outwardly in a degree sufficient to allow the stream of oil in its contracted high speed area to escape contact with the orifice walls. Wear of the orificed member is thus minimized.

In an advantageous embodiment of the present invention the orificed flow obstructing member takes the form of a removable disk or plate set in a supporting member of substantial thickness held in the valve casing; the inset disk orifice, in which the oil stream is contracted, being frustoconical in shape and the supporting piece having a wide outwardly flaring conical passage receiving the expanding stream of oil from the disk orifice substantially without frictional resistance of oil upon metal. The gate member advantageously takes the form of a rectangular, flat, apertured plate held slidably in the upstream face of the orifice disk and its supporting member by a retaining ring which may be fastened by screws screwed into the supporting member. Advantageously, the sharp cornered opening through the gate member may be formed in a removable button set in the plate, the inset button being of hard, abrasion resistant material and being easily renewable when subjected to severe conditions causing abrasion of the apertured button. Among the abrasion resisting materials suitable for the inset apertured button are alloy steels of great hardness and fine grain, such as the stainless steels and the nitrided steels, fused alumina or alundum, "Cyclops" forged steel containing 20 per cent nickel and 7.5 per cent chromium, tungsten carbide, chromium metal and rolled or forged Monel metal. The materials mentioned have the advantage of being resistant to corrosion as well as to abrasion.

The apertured plate forming the orifice entry gate is moved upon the orificed member by means of screw members engaging the end edges of the plate and operated through packed glands in the valve casing.

In a modification of my invention the gate member is formed with a rectangular opening registering with a cone shaped orifice passing through the flow obstructing member, the flow obstructing member being formed with a slot or groove in which the gate member seats. Fastened to the obstructing member is the seating slot and engaging the rectangular opening in the gate member is an insert lug or key member which also forms an edge of the entry portion of the conically flaring orifice in the obstructing member. In a further modification the key member is integral with the flow obstructing member. In such construction the orifice entry formed by the keyed rectangular gate opening and by the key member itself has a rectangular character influencing the contraction and succeeding expansion of the oil stream and serving to reduce abrasion.

The choke valve assembly may be contained in a single piece casing threaded or flanged for connection in a pipe line or the valve assembly may be held between flange members bolted together.

In choking the flow to the desired rate in order to reduce the abrasive effects of the oil stream, it is often desirable to avoid unduly high velocities in the oil stream at the contracted orifice of the choke. In such cases two or more flat faced orificed members may be arranged in series and spaced apart. With two orifices of the same size in series and a given pressure drop, the velocity of the flow through both orifices is reduced to about 70 per cent of that through a single orifice and three orifices in series reduce the velocity to about 58 per cent of the single orifice velocity; the wear of the orificed members being proportionally lessened. Two chokes of the same orifice size and connected in series, as I have found, wear more than twice as long as a single choke of smaller size and three chokes in series can be used more than three times as long without renewal of parts.

The pressures to be handled in different wells vary widely. And in a particular well the pressure changes with time. In choking a deep well in its early life, a pressure drop across the choke of 1200 pounds per square inch is not uncommon. Such a pressure drop may involve a lineal velocity of oil flow through the contracted orifice entry of 500 feet per second or more. Abrasive action of the oil stream upon ordinary metal may become serious at velocities of the order of 40 to 50 feet per second. An advantageous method of handling high pressure flow in the early stages of well operation is to spread the pressure drop over a plurality of contracted orifice chokes connected in series in the flow line at short intervals sufficient to allow the high velocity turbulence caused by each choking to subside before the flow reaches the succeeding choke. For this a distance between chokes equal to six diameters of the flow line pipe is usually sufficient. With a total pressure drop of 1200 pounds per square inch, for example, four sharp cornered thin lipped contracted orifices of equal area in series, divide the pressure drop into four drops of 300 pounds each. The abrasive action upon the contracted orifices is less than one quarter of that through a single smaller orifice with a pressure drop of 1200 pounds. The choke orifices remain constant more than four times as long; four flow beans or chokes lasting in use more than four times as long as a single choke for the same pressure drop.

In the accompanying drawings, I have shown, more or less diagrammatically, specific embodiments of my invention in several forms. In this showing, Fig. 1 is a side view in section of a choke valve assembly;

Fig. 2 is a front view of the valve assembly of Fig. 1;

Fig. 3 is a section along the lines 3—3 of Figs. 1 and 2, the section being at right angles to that of Fig. 1;

Fig. 4 is an exploded view of the variable orifice assembly of Figs. 1, 2 and 3;

Fig. 5 is a sectional view of a valve assembly arranged in a single piece casing;

Fig. 6 is a side view in section of a modified choke valve assembly held by bolted flanges;

Fig. 7 is a front view of the valve of Fig. 6;

Fig. 8 is an exploded view of the variable orifice assembly of Figs. 6, 7 and 9;

Fig. 9 is a section along the lines 9—9 of Figs. 6 and 7, the section being at right angles to that of Fig. 6;

Fig. 10 is a sectional view of another modification of a choke valve;

Fig. 11 is a front view of the choke valve of Fig. 10; and

Fig. 12 is a sectional view of a double orificed flow bean.

Referring first to Figs. 1 to 4, which illustrate a choke valve assembly having a variable orifice assembly of the removable button type, the numeral 10 designates a casing for the valve assembly. In the casing, which has a cylindrical bore or chamber 11 formed with an annular shoulder 12, is fitted a flow obstructing member 14 with an annular projecting portion 15, the member being held against the shoulder 12 by a ring 16 and screws 17. The upstream face of member 14 is substantially flat. Set in the central portion of this upstream face is a removable disk or plate 18 formed with a conical orifice 20 flaring outwardly toward the downstream side and the outwardly flared conical orifice is continued through the flow obstructing member 14. It is possible of course to have the orificed disk 18 integral with the flow obstructing member 14, in which case the orifice is formed as a continuous passage through the flow obstructing member. The removable disk is advantageous in being readily renewable when subjected to undue wear.

Variation of the effective orificial area is provided by a rectangular plate 22 slidable in a groove formed in the upstream face of member 14 and having an inset removable button 24 of abrasion resisting material formed with an aperture 26 adapted to register with the entry of orifice 20 of the flow obstructing member 14. The upstream face of button 24 is slightly coned inwardly so that the edge of aperture 26 is thin and sharp cornered. The slidable plate 22 forms a gate member and is held against member 14 by a retaining ring 28 which is held by screws 30 screwed into member 14. The position of the gate member 22 upon member 14 is adjusted by means of two screw members 32 which are threaded into the casing 10 and provided with packing glands 34. The screw members 32 engage each end of gate 22. Member 14 and ring 28 are grooved at 31 and 33 to facilitate the action of screws 32 in sliding the plate 22.

In operation, the effective area of the valve orifice is determined by setting the position of the gate 22 upon the member 14, this position controlling the relation of aperture 26 to orifice 20. In the position shown in Figs. 1 to 3 the edge of the entry of orifice 20 is overlapped by aperture 26. This makes the effective orificial area relatively small and the lineal velocity of the oil flow at the orifice entry proportionally high. The oil stream is caused to contract for a considerable distance below the entry. Contraction of the stream away from the orifice wall in the zone of high stream velocity prevents erosion of the wall. Below the zone of contraction the stream forms eddy currents of low velocity. The abrasive action of sand carried by the oil is for the most part confined to the upstream edge of aperture 26 and by making button 24 of hard, fine grained material resisting abrasion, the effective orificial area remains constant for relatively long periods. However, as the inevitable wear occurs, it can be compensated by changing the position of the gate member. If one side of the edge of aperture 26 wears unduly the gate can be moved to a position bringing the other side of the aperture into registration with orifice 20. A nice control of the orifice area is afforded. The life of the valve is lengthened and when the orificial area finally becomes unduly enlarged by wear, the life of the valve is readily renewed by replacing button 24 with a new apertured button. Inset disk 18 can also be renewed.

In Figs. 6, 7, 8, 9, I have shown a modified variable orifice choke which may be distinguished as of plate and key type. In this modified valve assembly, a flow obstructing member 40 is held against a casing shoulder 41, by ring 42 and screws 43. In member 40 is formed a continuous orifice passage 44 of sharp conical shape. In the upstream face of member 40 is formed a slot or groove 46 in which seats the slidable gate member 48 taking the form of a plate having a rectangular aperture 50 adapted to register with orifice 44. In a groove 51 in the bottom of seating slot 46, a lug or key 52 is fastened by means of screw 54. This key has a projecting portion 53 which engages the rectangular aperture 50 in the gate plate 48. Key 52 has a flat end face 55 which extends into the orifice passage 44, and forms a part of the orifice wall, the end of the projecting portion 53 forming an edge of the orifice entry. Key 52 is best made of hard material adapted to resist abrasion. Suitable materials are those mentioned for the apertured button 24 shown in Figs. 1 to 4. A retaining ring 56, held by screws 57 holds the gate plate 48 in its seating slot 46 with aperture 50 engaged by the projecting portion 53 of key 52. The gate plate is moved similarly to the gate of the structure of Figs. 1 to 4 by setting screws 58 threaded in the casing and provided with packing glands 59 and handles 60.

In operation the plate and key type of choke acts in a manner similar to that of the button type. The oil stream is contracted by the small rectangular orifice entry and the orifice wall for the most part escapes erosion. The mechanical energy used in overcoming the resistance of the choke is dissipated as heat in the swirling eddy currents induced in the stream by the orifice contraction. These eddy currents are of low velocity and have little erosion action. For the most part frictional wear is confined to the key member 52 and this wear is readily compensated by adjusting the aperture 50 with relation to the orifice entry. The key member is readily renewable. The choking effect is susceptible of nice adjustment and the valve is rugged and relatively long lived.

In Figs. 6 and 7 I have illustrated a valve casing comprising three members flanged and bolted together around the choke assembly with two gaskets indicated at 62. In Fig. 5 the showing is of a single piece casing with flanges for connection into a pipe line. Either form of casing may be used as desired.

In Figs. 10 and 11 is shown a modified plate and key choke in which the key is integral with the flow obstructing member. In the embodiment illustrated, the flow obstructing member may take the form of a disk 66 held between two flanges 68 threaded upon pipes 70 in the flow line and bolted together by bolts 72. The disk 66 is formed with a rectangular beveled flaring orifice 74 and with a key portion 76 projecting from a groove in the upstream face in which a gate plate 78 seats. A rectangular slit or opening 80 in the gate plate registers with the beveled orifice 74 and is engaged by the key 76. The gate plate is retained in its seat in disk member 66 by a ring 82 and screws 84. Annular gaskets 86, advantageously of lead-antimony alloy, are provided to prevent leakage of oil around the orificed flow obstructing disk.

The rectangular opening 80 in the gate plate is best made with a sharp cornered edge on the upstream face formed by a facing 90 of hard material applied to the plate by means such as welding around the opening 80 where it registers with the orifice 74. Materials such as those specified for the button 24 of Figs. 1 to 4 are suitable for this facing. A tungsten carbide welded facing has been found to be particularly efficacious in resisting abrasion by the sand carried in the oil stream. The hard facing lengthens the period during which the choking effect can be properly controlled without requiring renewal of parts. The contraction of the oil stream by the sharp cornered and thin lipped orifice entrance substantially prevents abrasion of the parts except to a small extent at the orifice entrance corner. Such abrasion is reduced to a minimum by the hard facing.

Where heavy oil well pressures have to be dealt with, adequate choking through a single orifice may require contraction of the orifice to an effective area so small as to cause exceedingly high velocity in the oil stream at the contracted orifice entry. In such cases two or more chokes may be placed in series in the flow line so that the total pressure drop may be divided and relatively moderate flow velocities produced in the several chokes; abrasive effects being greatly lessened. For this purpose a series of chokes may be spaced apart in the flow line at distances equal to about six diameters of the flow line pipe so that high velocity turbulence in the stream caused by each choke may subside before the stream reaches the succeeding choke.

For series choking the valve assembly illustrated in Figs. 10 and 11 is convenient, the number of chokes being that required to effect the desired pressure drop. The chokes may be permanently connected in series so as to be handled as a single flow bean.

Where a plurality of chokes are required, a flow bean with two orificed disks threaded into each end of a single pipe nipple has been found useful. Such a flow bean is illustrated in Fig. 12. In the specific embodiment shown, a heavy walled nipple 92, of three inches internal diameter and 18 inches long, has a tapered and orificed disk 93 threaded into the upstream end and another tapered and orificed disk 94 at the downstream end. As shown, the construction is such as to permit disk 93 to be inserted in the nipple through the downstream end and screwed tight into the upstream end by a spanner used in slot 95, disk 94 being then screwed into place at the downstream end by a pin spanner used in holes 96. The upstream disk 93 may be about an inch thick and the downstream disk 94 about ¾ inch thick. In disk 93 is formed an orifice 97 with a cylindrical portion at the upstream face ½ inch in diameter and not over $\tfrac{1}{16}$ inch deep, and flaring to a diameter of about two inches at the downstream face. The orifice 98 in disk 94 is ½ inch to 1¾ inches. The orificed disks may themselves be made of special abrasion resistant material or they may have buttons 99 of such material set in the upstream faces as shown. The button in the downstream disk is shown as screw threaded and having spanner holes.

The action of the oil stream in contracting and expanding in eddy currents under the influence of the restricted orifice with a sharp cornered entry is indicated by the arrows in Fig. 10.

What I claim is:—

1. A variable orifice choke for regulating the flow of oil wells and for like purposes which comprises a casing adapted for connection in the flow line, a substantially flat faced member held in said casing to obstruct the flow of oil and having formed therein an axial orifice contracted at the upstream entry end and flaring outwardly toward the downstream end, a flat faced gate member slidably held upon the upstream face of the orificed member and having a thin lipped, sharp cornered opening formed therein adapted to register with the contracted orifice entry and adjustable means for sliding the gate member to vary the effective area of the contracted orifice entry.

2. A variable orifice choke valve comprising in combination a casing holding a stationary flat faced flow obstructing member having formed therein an axial passage therethrough contracted at the upstream face of said member and immediately flaring outwardly toward the downstream side, a slidable, thin, flat faced gate held upon the upstream side of said stationary member and having a thin lipped, sharp cornered aperture adapted to register with said contracted axial passage and to form a contracted thin lipped orifice entrance of variable area depending upon the position of said gate, means slidably retaining the gate to the stationary member and adjustable means extending through the casing for sliding the gate and for setting it in an adjusted position.

3. A variable orifice choke valve comprising in combination a casing holding a stationary flow obstructing member with a substantially flat upstream face and having formed therein an axial passage therethrough contracted and thin lipped at said upstream face and flaring outwardly toward the downstream face, a slidable gate held upon the upstream face of said stationary member, a removable button of abrasion resisting material set in said gate and having a sharp cornered aperture adapted to register with said axial passage and to form a contracted thin lipped entrance of variable area depending upon the position of said gate, means slidably retaining the gate to the stationary member and means extending through the casing for adjusting the position of the gate.

4. A variable orifice choke valve comprising in combination a casing holding a stationary flow obstructing member with a substantially flat upstream face and having formed therein an axial passage therethrough flaring outwardly toward the downstream side of said member, a disk set in said member at the upstream side and having a contracted orifice communicating with said axial passage and a gate member provided with means for retaining it slidably against the upstream face of said disk and with an aperture adapted to register with the disk orifice and also provided with means for adjusting the position of the gate member to vary the effective area of the disk orifice.

5. In a variable orifice choke valve having a casing with coupling means for connection in a pipe line, means providing a variable valve orifice comprising in combination a flow obstructing member fitted in the casing and having formed therein a conical orifice flaring outwardly to its downstream face and a seating groove in its upstream face, a slidable plate seated in said groove and having a rectangular aperture adapted to register with the obstructing member orifice, a key member mounted in the seating slot and engaging said rectangular aperture and limiting the entrance to the conical orifice and adjustable means extending through the casing for sliding the plate to vary the effective area of the valve orifice.

6. In an oil well flow bean or choke, an orificed member having a substantially flat upstream face resisting the flow of oil, the orifice being contracted at its upstream entrance, and a gate formed by a thin plate slidably held against said upstream face and provided with a small opening adapted to register with the contracted orifice entrance, said plate opening thin lipped and being sharp cornered at the upstream face and adapted to contract the oil stream away from the orifice walls.

7. In the flow bean of claim 6, a renewable button removably set in the gate plate and having the sharp cornered opening formed therein, said renewable button being of hard, abrasion resistant material.

8. In the flow bean of claim 6, a facing of hard, abrasion resistant material in the upstream face of the slidable plate around the opening and forming the sharp corners.

9. In an oil well flow line, means for choking the flow comprising a plurality of flow obstructing members connected in the line, each of said members having a substantially flat upstream face and a conical axial orifice, said orifices being provided at the upstream faces of the obstructing members with thin lipped, flat faced contracting members formed of abrasion resistant material and adapted to provide sharp corners for the orifice entrances, each contracting member being adapted to contract the oil stream away from its respective orifice walls and to allow the oil stream to expand immediately upon passing the orifice and the flow obstructing members being spaced apart in the flow line and arranged in series.

10. Means for choking the flow of oil in an oil well flow line which comprises a nipple of substantial length adapted for connection in the flow line, two orificed disks having flat faces placed at each end of said nipple across the line of flow, said disk orifices being formed with thin cylindrical contracted portions at the upstream faces and with conical portions flaring outwardly to the downstream faces, and hard abrasion resistant elements at the upstream faces of the disks surrounding the contracted portions of the disk orifices and providing sharp corners at the orifice entrances.

REGINALD J. S. PIGOTT.